A. D. WACK.
RESILIENT WHEEL.
APPLICATION FILED SEPT. 12, 1910.
1,007,993.
Patented Nov. 7, 1911.
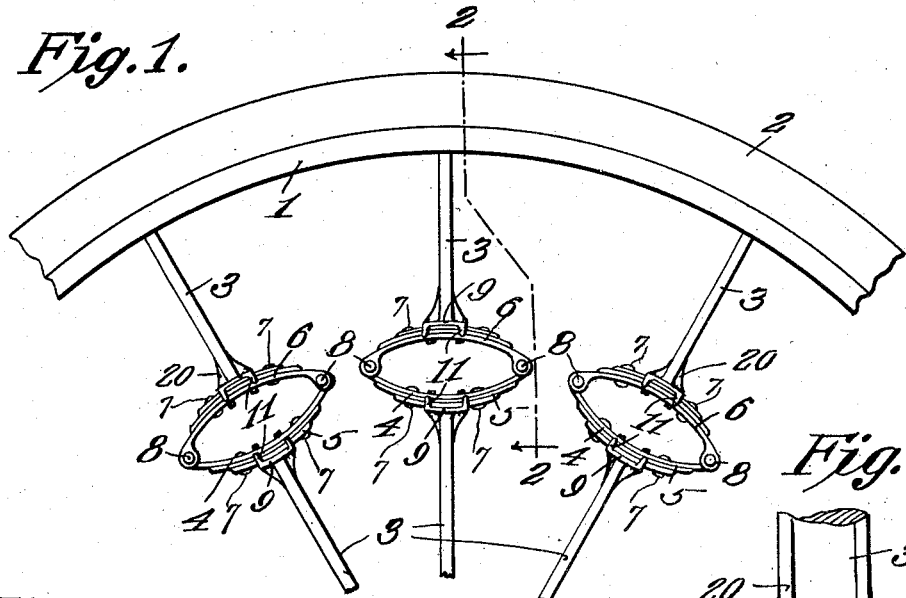
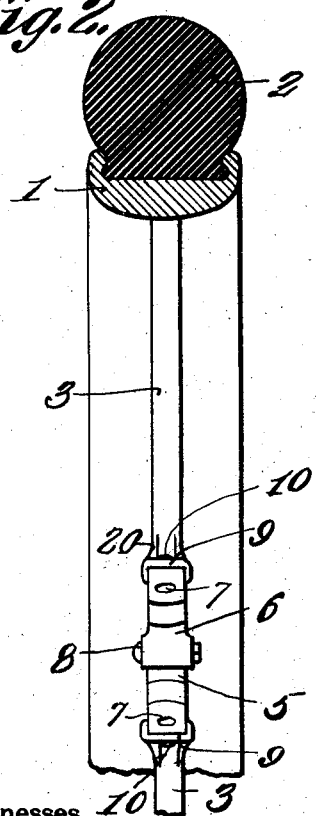
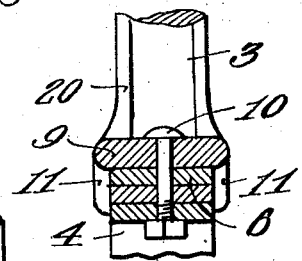
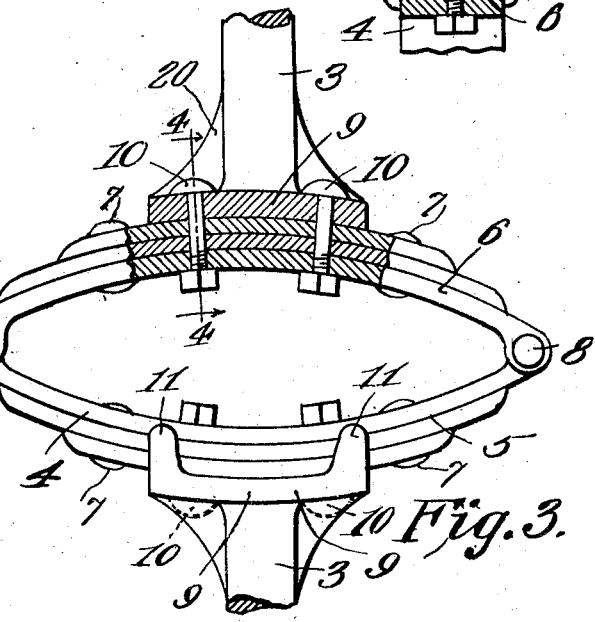
Arthur D. Wack
Inventor
by C. A. Snow & Co.
Attorneys
Witnesses

UNITED STATES PATENT OFFICE.

ARTHUR DARBY WACK, OF ST. LOUIS, MISSOURI.

RESILIENT WHEEL.

1,007,993.  Specification of Letters Patent.  Patented Nov. 7, 1911.

Application filed September 12, 1910. Serial No. 581,511.

*To all whom it may concern:*

Be it known that I, ARTHUR DARBY WACK, a citizen of the United States, residing at St. Louis, State of Missouri, have invented a new and useful Resilient Wheel, of which the following is a specification.

It is the object of the present invention to provide a novel vehicle wheel of that type embodying springs as cushioning elements. The invention aims more particularly to provide a vehicle wheel the spokes of which are in sections between which sections bowed springs are interposed, and the novelty of the invention resides in the particular connection between the spoke sections and the spring.

In the accompanying drawings,—Figure 1 is a side elevation of a portion of a wheel constructed in accordance with the present invention. Fig. 2 is a transverse sectional view on the line 2—2 of Fig. 1. Fig. 3 is a detail view partly in side elevation and partly in section, of a portion of one of the spokes of the wheel. Fig. 4 is a sectional view on the line 4—4 of Fig. 3.

In the drawings, the numeral 1 indicates the rim of the wheel and 2 a tire which is fitted thereon and may be of any desired construction.

The spokes of the wheel are formed each of two sections, the sections being indicated by the numeral 3.

The cushioning springs of the wheel are in the form of bowed springs similar to those used in supporting vehicle bodies, these springs being secured between the inner ends of the outer sections of the spokes and the outer ends of the inner sections thereof. The springs above referred to are indicated in the drawings by the numeral 4 and the bows thereof are indicated specifically by the numerals 5 and 6, the bow 5 of each spring being the inner bow and the bow 6 the outer one. The bows 5 and 6 of each cushioning spring 4 are pivotally connected at their ends as at 8 and the inner end of the outer spoke section 3 is secured to the outer bow 6 of one of the springs, the inner section 3 of the same spoke being secured at its outer end to the bow 5 of the said spring.

The ends of the spoke sections mentioned above are formed each with a head 9 bolted as at 10 to the respective bow 5 or 6 and formed with fingers 11 of which there are a pair at each lateral edge of the head. The sections are united with the heads 9, by means of spaced flanges 20, extended parallel to the plane of the wheel. The bolts 10 pass through the heads 9, between the flanges 20. These fingers 11 project beside the respective spring bows so that each bow of each spring is confined between the two pairs of fingers upon the head to which it is secured. These fingers effectually brace the bows of the springs against lateral displacement with respect to the head and consequently prevent overturning of the outer portion of the wheel with respect to the inner portion thereof.

Owing to the fact that the bolts 10 pass through the heads 9 between the flanges 20, any strain imposed upon the heads 9, through the bolts 10, will be carried upwardly and downwardly, evenly, into the spoke sections. Owing to the fact that the fingers 11 extend along the sides only of the springs, the springs may readily be disengaged from between the fingers. Moreover, owing to the fact that the springs are exposed throughout their entire transverse extent, between the fingers, a tool may be inserted between the heads 9 and the outer faces of the springs, to pry the springs loose from the bolts 10.

What is claimed is:—

A wheel comprising spaced spoke sections provided at their adjacent ends with transverse heads extended upon each side of the sections, in the plane of the wheel; bowed springs resting against the heads; and securing devices extended through the springs and through the heads, upon both sides of the sections, in the plane of the wheel; the sections and the heads being united by spaced flanges, extended parallel to the plane of the wheel, between which flanges the securing devices are located; the heads having spaced fingers, engaging the sides only, of the springs, the springs being exposed, throughout their entire transverse extent, between the fingers.

In testimony that I claim the foregoing as my own, I have hereto affixed my signature in the presence of two witnesses.

ARTHUR DARBY WACK.

Witnesses:
C. A. NELSON,
J. H. WACK.

Copies of this patent may be obtained for five cents each, by addressing the "Commissioner of Patents, Washington, D. C."